March 23, 1926.
H. SONNENBERG
MOLDING MACHINE
Filed Oct. 2, 1924
1,577,597
2 Sheets-Sheet 1
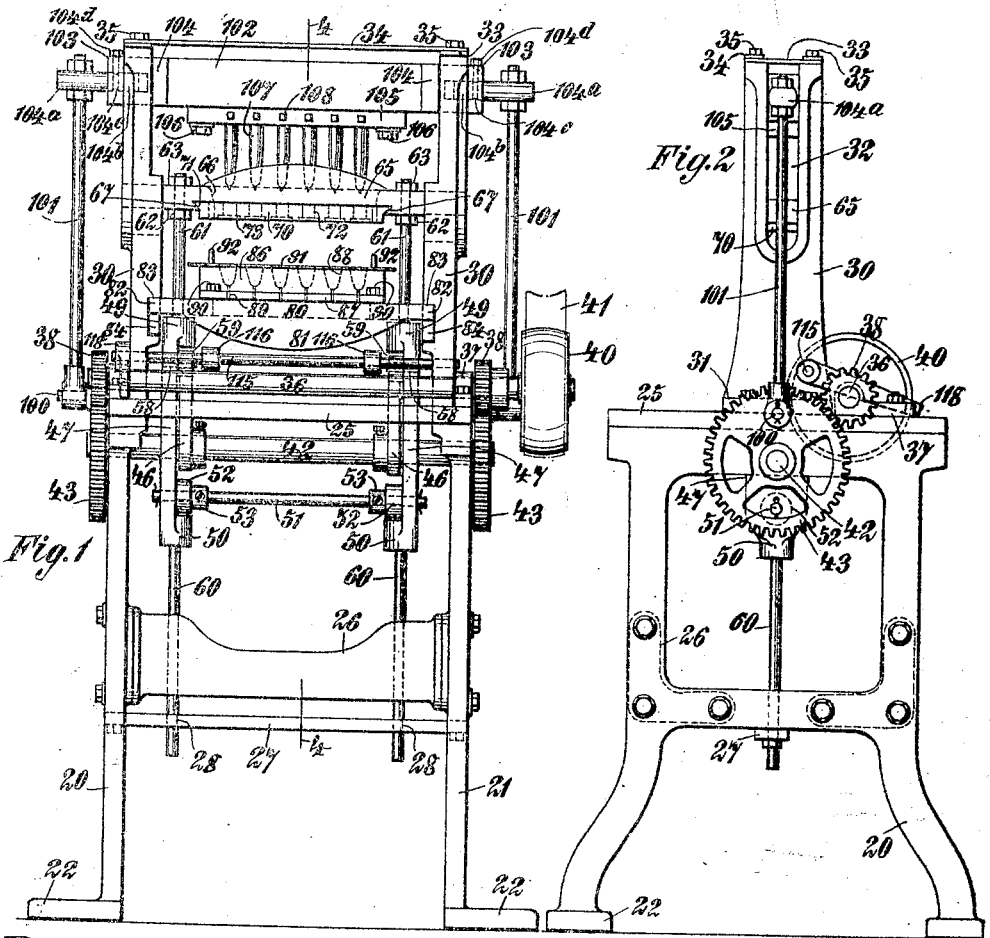
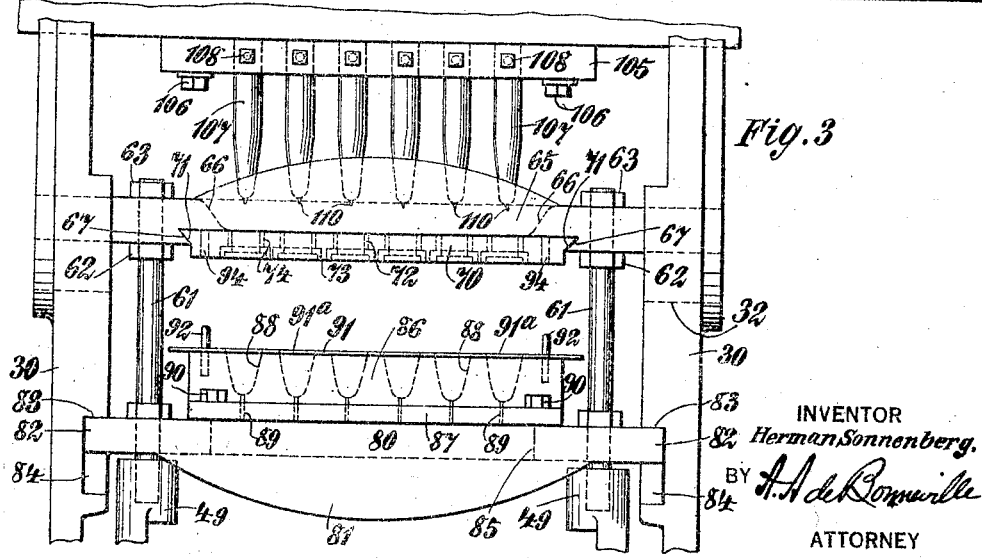
INVENTOR
Herman Sonnenberg.
BY
ATTORNEY

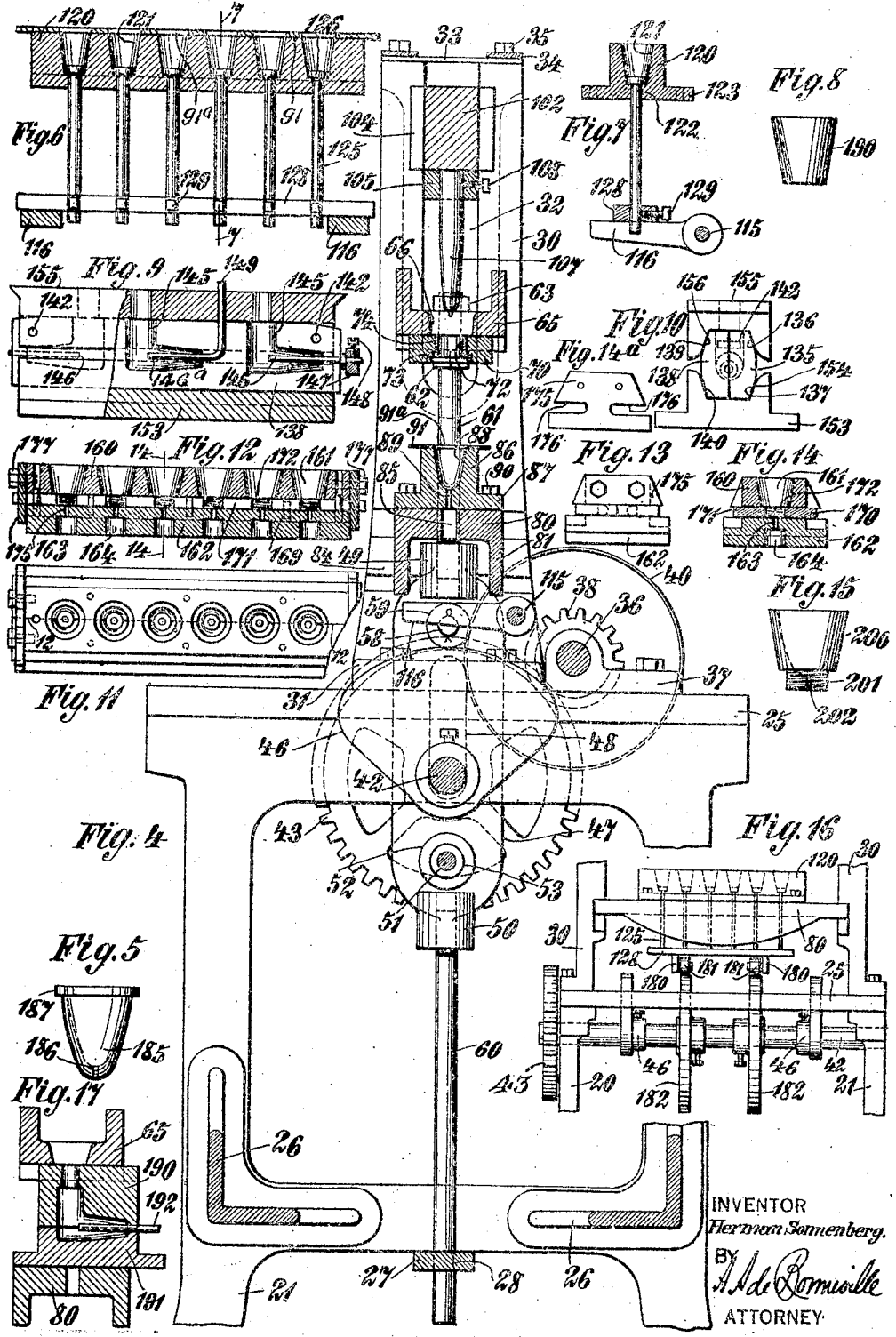

Patented Mar. 23, 1926.

1,577,597

UNITED STATES PATENT OFFICE.

HERMAN SONNENBERG, OF MIDDLE VILLAGE, NEW YORK.

MOLDING MACHINE.

Application filed October 2, 1924. Serial No. 741,190.

*To all whom it may concern:*

Be it known that I, HERMAN SONNENBERG, a citizen of the United States, and resident of Middle Village, in the county of Queens and State of New York, have invented certain new and useful Improvements in a Molding Machine, of which the following is a specification.

This invention relates to a molding machine, and is an improvement of the machine described in United States Letters Patent No. 884,228, dated April 7th 1908.

The object of the invention is the production of a molding machine with a stationary bottom mold, a reciprocating upper mold and reciprocating plungers coacting with both of said molds.

The organization of the invention comprises a platform supported on a pair of legs, and the platform in turn supports a pair of guide frames. An auxiliary table supports a bottom mold, and a reciprocating crosshead has depending therefrom an upper mold. A third reciprocating crosshead has extending therefrom a plurality of dies or plungers for both of the molds.

In the accompanying drawings Fig. 1 represents a front elevation of an exemplification of the improved molding machine; Fig. 2 is a left hand view of Fig. 1; Fig. 3 shows an enlarged fragmentary portion of Fig. 1; Fig. 4 indicates an enlarged section of Fig. 1 on the line 4, 4; Fig. 5 represents an elevation of an inner bowl for a pipe; Fig. 6 indicates enlarged details of the machine partly in vertical section; Fig. 7 shows a partial section of Fig. 6 on the line 7,7; Fig. 8 represents an elevation of another form of an inner bowl for a pipe; Fig. 9 represents a side elevation partly in axial section of a pair of molds for the machine; Fig. 10 is a left hand view of Fig. 9; Fig. 11 shows a top plan view of another pair of molds for the machine; Fig. 12 is a section of Fig. 11 on the line 12, 12; Fig. 13 is a left hand side view of Fig. 12; Fig. 14 indicates a section of Fig. 12 on the line 14, 14; Fig. 14ª shows an elevation of a detail; Fig. 15 represents an elevation of another form of inner bowl for a pipe; Fig. 16 represents a fragmentary portion of Fig. 1 with a modification, and Fig. 17 shows a fragmentary portion of Fig. 4 with a modification.

The molding machine comprises a table with the similar legs 20, 21 each with the feet 22. A platform 25 is supported upon the legs 20 and 21. A pair of angle shaped braces 26 connect the legs 20 and 21. A bar 27 with the guide openings 28 extends between and is connected to the legs 20 and 21. A pair of guide frames 30 each with the bottom flange 31 and the guide opening 32 are supported upon and fastened to the platform 25. A plate 33 is located upon the top end of each of the frames 30, and a pair of connecting braces 34 have their ends supported upon the plates 33, and bolts 35 connect said plates and braces to the top ends of said frames.

A main shaft 36 is journaled in the journal bearings 37, which latter are bolted to the top face of the platform 25. A pair of pinions 38 are fastened to the shaft 36 adjacent to its ends. A pulley 40 for the belt 41 is fastened to one end of the shaft 36. A cam shaft 42 has its ends journaled in the upper portions of the legs 20 and 21. A pair of spur gears 43 are fastened to the cam shaft 42 and mesh with the pinions 38. A pair of cams 46 are fastened to the cam shaft 42.

A pair of reciprocating members 47 are each indicated with the elongated opening 48, and have each formed therewith the top lug 49 and the bottom lug 50. A shaft 51 extends through and is fastened to the lower ends of the members 47. A pair of rollers 52 are journaled on the shaft 51. Guide collars 53 are fastened to the shaft 51 and maintain the said shaft rollers in proper position. A pair of pins 58 extend from the upper end of each of the members 47 and have each journaled thereon the upper rollers 59. The rollers 52 and 59 coact with the cams 46 to reciprocate the members 47. To each of the lugs 50 is fastened a guide rod 60, which rods extend through the guide openings 28 in the bar 27. To each of the top lugs 49 is fastened a rod 61, which is threaded at its upper end for the nuts 62 and 63.

A cross head 65 has its ends guided in the guide openings 32 of the frames 30, and has openings formed therein for the threaded ends of the guide rods 61. The cross head 65 is clamped to the guide rods 61 by means of the nuts 62 and 63. The lower faces of the crosshead 65 is dovetailed as shown at 67. The crosshead 65 has extending therethrough the elongated opening 66.

An upper mold is indicated at 70 with the tapered end walls 71 which tightly engage the dovetails 67 of the said crosshead. A plurality of bushings 72 with the enlarged lower ends 73 are secured in openings 74 in the upper mold 70.

An auxiliary table is indicated with the platform 80 with the depending flanges 81 and the extensions 82. The said extensions enter openings 83 in the frames 30, and are locked in said openings by means of the wedge blocks 84. An elongated opening 85 is formed in the platform 80.

A bottom mold 86 has formed with its lower end the flanges 87 and is provided with the cavities 88, which extend from its upper face and are axially in line with the openings 74 of the upper mold 70. An opening 89 extends from the lower end of each cavity 88 through the said bottom mold. Bolts 90 fasten the bottom mold 86 to the platform 80.

A stripper plate 91 with a plurality of openings 91ª is detachably located upon the top face of the bottom mold 86 and has extending therethrough a pair of dowel pins 92, which are fastened in the bottom mold 86 and extend into the openings 94 in the upper mold 70.

A journal pin 100 extends from each of the spur gears 43 and supports one end of the connecting rod 101. The upper end of the connecting rod is connected to the cross head 102. The ends 103 of the cross head extend through the openings 32 of the frames 30 and projecting lugs 104 of the cross head 102 bear against the inner faces of the frames 30. A bracket 104ª with the cylindrical shank 104ᵇ having the groove 104ᶜ is rotatably connected to the side of the ends 103 of the cross head 102 by the bolts 104ᵈ. A plunger holder 105 is bolted to the lower face of the cross head 102 by means of the bolts 106, and dies or plungers 107 have their upper ends located in openings in said holder, and are clamped in place by means of the screws 108. The said plungers are axially in line with the openings 74, in the upper mold 70. The plungers 107 have extending from their lower ends the pins 110.

A bar 115 has its ends journaled in the guide frame 30 and has fastened thereto the arms 116. An operating handle 118 has one end fastened to one end of the bar 115.

Referring to Figs. 6, 7 and 8, a modified bottom mold 120 has formed therewith the tapered cavities 121 with the lower opening 122 and the flanges 123. The said bottom mold is placed upon and fastened to the auxiliary table having the platform 80. Stripper rods 125 extend through the openings 122 and each are provided with the head or cap 126. The lower ends of the stripper rods 125 extend through openings in the bar 128 and are fastened in place by means of the screws 129. The bar 128 is positioned so that the arms 116 can bear up against its lower face. With the bottom mold 120, suitable plungers not shown, are provided for the plunger holder 105. The stripper plate 91 with its openings 91ª are used with the construction indicated in Figs. 6, 7 and 8.

Referring to Figs. 9 and 10, a mold is shown with the member 135 having the upper tapered end 136 and the lower tapered end 137, and the coacting member 138 with the upper tapered end 139 and the lower tapered end 140. Dowel pins 142 are provided for the members 135 and 138 to maintain them in proper position. The members 135 and 138 have formed therein cavities 145 which conform to the pipe or bowl that is to be molded. Rods 146 extend into the mold to said cavities. The rods 146 are each fastened to a supporting knob 147 by means of the screws 148. Rods with the members 146ª and 149 are also provided for the members of the mold. A bottom support 153 with the inclined inner walls 154 supports the lower ends of the members 135 and 138. A cap 155 with the tapered walls 156 is provided for the upper ends of the members 135 and 138. The cap 155 is detachably connected to the cross head 65 and the bottom support 153 is fastened to the platform 80.

Referring to Figs. 11, 12, 13, 14, and 14ª a mold is indicated with the top member 160 having the plurality of tapered cavities 161. A bottom member 162 has formed therein a plurality of small openings 163 which connect with larger openings 164. The openings 163 and 164 are axially in line with the cavities 161. From the bottom member 162 extend a plurality of dowel pins 169. A middle plate comprises the members 170 and 171 and on the inner edge of each of said members are formed a plurality of threads 172. The threads of one member with the threads of the other member, when the inner edges of said members 170 and 171 bear against each other, form a plurality of complete threads. The members 170 and 171 have openings that register with the dowel pins 169. End plates 175 with the elongated openings 176 are bolted to the top member 160 by means of the bolts 177.

Referring to Fig. 16 a modification of the invention is shown.

The legs 20 are again shown with the platform 25. The auxiliary table is again indicated with the platform 80. The guide frames are shown at 30. The bottom mold 120 is shown supported upon the platform 80. The stripper rods 125 are indicated with the bar 128. From the bar 128 extend journal lugs 180 to which are journaled rollers 181. The shaft 42 with its appurtenances already described has also provided therefor the cams 182 which coact with the rollers 181. Referring to Fig. 17 the cross head 65 is indicated with the upper mold 190, the bottom mold 191 is supported on the platform 80. Rods 192 similar to the rods 146 are provided for the molds. The molds 190 and 191 are used for molding pipes similar to the pipes formed with molds shown in Figs. 9 and 10.

To use the molding machine and referring particularly to Figs. 1 to 5 inclusive, the clay or other material used to produce the objects to be molded is inserted in the cavities 88 of the bottom mold 86. The pulley 40 is turned, by means of the belt 41, and thereby through the main shaft 36, the pinions 38 are turned. The spur gears 43 turn with the pinions 38, whereby the cam shaft 42 is turned. The cams 46 revolve with the turns of the shaft 42, and thereby through the coaction of the rollers 52 and 59, the members 47 are reciprocated and whereby the cross head 65 is lowered to bear upon the stripper plate 91 and at the proper time is raised. At the same time, by reason of the turning of the spur gears 43, the cross head 102 is lowered and the plungers 107 descend through the bushings 72 of the upper mold 70 and enter the cavities 88 of the bottom mold 86, and the clay or other material is shaped to the proper form to produce the inner bowl 185 with the opening 186 and flange 187 for a pipe. Next the stripper plate 91, when the cross head 65 is in its elevated position, is removed from the bottom mold 86 and thereby the bowls 185 are removed from said bottom mold.

When bowls like 190, shown in Fig. 8 are to be made, the bottom mold 120 is substituted for the bottom mold 86. The clay or other material is fed into the cavities 121, and suitable plungers or dies not shown extend from the cross-head 102. To eject the bowls after being formed, from the cavities 121, the operator bears on the operating handle 118, and the arms 116 which bear up against the bar 128 will raise the latter, thereby the stripper rods 125 with their caps 126 are raised and loosen the bowls 190 from the cavities 121 of the bottom mold 120.

The cams 182 may be shaped so that the stripper rods 125 will follow the movements of the plungers of the molds moving at the same speed, or they may be shaped so that the plungers are released from the objects molded before the stripper rods push the objects molded out of their molds.

When pipes are to be molded, the molds indicated in Figs. 9 and 10 are used. The clay is inserted in the cavities 145 and the rods 146 and those with the members 149 and 146ª are used to form the stem openings of the pipes. Suitable plungers operate with this mold and when the pipes are to be extracted from the molds the members 135 and 138 are separated.

The molds shown in Fig. 17 are used to produce pipes similar to those produced with the molds shown in Figs. 9 and 10 as already stated. When a bowl like 200 with the threaded shank 201 and opening 202 (Fig. 15) is to be formed, the bottom mold with the members 160 and 162 (Figs. 12 to 14) is used. Suitable plungers not shown are reciprocated by the cross head 102. The members 160 and 162 with their appurtenances are assembled as shown in the drawings when the bowls 200 are being formed. To remove the bowls 200 the members 160 and 162 are separated, when the members 170 and 171 can easily be detached. The operator then forces the bowls 200 out of the cavities 161 by bearing on the outer face of each of the shanks 201. Various modifications may be made in the invention and the present exemplification is to be taken as illustrative and not limitative thereof.

Having described my invention what I desire to secure by Letters Patent and claim is:

1. In a molding machine the combination of a table, connected thereto, a bottom mold supported on said table, a cross head guided in the machine, an upper mold depending from said cross head, a cam shaft journaled in the machine, means to turn the shaft, a pair of cams fastened to the cam shaft, a pair of guided reciprocating members in the machine, connections between said members and the cross head, said cams adapted to reciprocate said members, a second reciprocating cross head in the machine and plungers depending from the second cross head coacting with both of said molds.

2. In a molding machine the combination of a pair of legs, a pair of guide frames above said legs, an auxiliary table connected to said frames, a bottom mold supported on said table, a cross head with its ends guided by said frames, an upper mold depending from said cross head, a cam shaft with its ends journaled in said legs, means to turn the cam shaft, a pair of cams fastened to the cam shaft, a pair of members guided in the machine, said members reciprocated by said cams, connections between said members and said cross head, an upper mold depending from said cross head, a second reciprocating cross head in the machine and plungers depending from said second cross head coacting with both of said molds.

3. In a molding machine the combination of a pair of legs, a platform supported on the legs, a pair of guide frames supported on the platform, an auxiliary table locked to said frames, a bottom mold supported on said table, a cross head with its ends guided in openings in said guide frames, an upper mold depending from said cross head, a cam shaft journaled in the legs of the machine, means to turn the cam shaft, a pair of cams fastened to the cam shaft, a pair of reciprocating members, each with an elongated opening for the machine, said cam shaft extending through the openings of said members, means to guide said members, a rod with one end of each extending from the upper end of each of said members and the other ends of said rods connected to said cross head, rollers journaled to each of said members adapted to coact with said cams to reciprocate said members, a second crosshead with its ends guided in said guide frames, means to reciprocate the second crosshead and plungers depending from said second crosshead coacting with both of said molds.

4. In a molding machine the combination of a table connected thereto, a bottom mold supported on said table, a crosshead guided in the machine, an upper mold depending from said crosshead, a cam shaft journaled in the machine, means to turn the cam shaft, cams fastened to the cam shaft, a pair of guided reciprocating members in the machine, connections between said members and said crosshead said cams adapted to reciprocate said members, a second reciprocating crosshead in the machine, plungers depending from the second crosshead coacting with both of said molds, stripper rods extending into the lower molds, a bar connecting the lower ends of the stripper rods and means to raise said bar to elevate the stripper rods to loosen the objects made by the molds from the same.

5. In a molding machine the combination of a table connected thereto, a bottom mold supported on said table, a crosshead guided in the machine, an upper mold depending from said crosshead, a cam shaft journaled in the machine, means to turn the cam shaft, a pair of cams fastened to the cam shaft, a pair of guided reciprocating members in the machine, connections between said members and said crosshead, said cams adapted to reciprocate said members, a second reciprocating cross head in the machine, plungers depending from the second cross head coacting with both of said molds, stripper rods extending into the lower mold, a bar connecting the lower ends of the stripper rods, a second pair of cams fastened to the cam shaft coacting with said bar to elevate the stripper rods to loosen the objects made by the molds from the same.

6. In a molding machine the combination of a table connected thereto, a bottom mold detachably fastened to said table, a stripper plate detachably located upon the top face of the bottom mold, a cross head guided in the machine, an upper mold detachably connected to said crosshead, a cam shaft journaled in the machine, means to turn the cam shaft, cams fastened to the cam shaft, a pair of guide members in the machine adapted to reciprocate, connections between said members and said crosshead, said cams adapted to reciprocate said members, a second reciprocating crosshead in the machine and plungers depending from the second crosshead coacting with said molds.

7. In a molding machine the combination of a pair of legs, a pair of guide frames above said legs, an auxiliary table connected to said frames, a bottom mold detachably fastened to the upper face of said table, a crosshead with its ends guided in guide openings in said frames, an upper mold detachably connected to said crosshead, a cam shaft journaled in the machine, cams fastened to the cam shaft, a pair of guided members in the machine adapted to reciprocate, connections between said members and said crosshead, a roller journaled adjacent to the upper end and a roller journaled adjacent to the lower end of each of said members, said cams coacting with said rollers to reciprocate said members, a second reciprocating crosshead in the machine and plungers depending from said second crosshead coacting with said molds.

8. In a molding machine the combination of a pair of legs, a platform supported upon the legs, a pair of guide frames supported upon the platform, an auxiliary table detachably connected to said frames above said platform, a bottom mold detachably fastened to the upper face of said table, a crosshead with its ends guided in guide openings in said frames, an upper mold detachably connected to said crosshead, a cam shaft journaled in the machine, cams fastened to the cam shaft, a pair of guided members in the machine adapted to reciprocate, connections between said members and said crosshead, said cams coacting with said members to reciprocate them, a second reciprocating crosshead in the machine, plungers depending from the second crosshead coacting with said molds, a main shaft journaled in the machine, a pinion fastened to each end of the main shaft, a spur gear fastened to each end of the cam shaft meshing with the pinion on the main shaft on the same side of the machine, a connecting rod with one end pinned to one of said spur gears and its other end connected to the second crosshead, a second connecting rod with one end pinned to the other spur gear and its other end connected to said second crosshead and means to turn the main shaft.

9. In a molding machine the combination of a table, a crosshead guided in the machine, a cam shaft journaled in the machine, means to turn the cam shaft, cams fastened to the cam shaft, a pair of guided members adapted to reciprocate in the machine, connections between said members and the crosshead, said cams adapted to reciprocate said members, a second reciprocating crosshead in the machine, a mold comprising a top member with a plurality of cavities and a bottom member with a plurality of openings, means to detachably lock the members of the mold to each other, means to fasten the bottom member of the mold to said table, a middle plate comprising a pair of members, between the top and bottom member of the mold detachably locked in place, the members of the middle plate having on their adjoining edges openings with threads, and plungers depending from the second crosshead coacting with said mold.

10. In a molding machine the combination of a table connected thereto, a bottom mold fastened to the table, a stripper plate detachably located upon the top face of the said bottom mold, a reciprocating cross head guided in the machine, an upper mold connected to said cross head, a second cross head in the machine, means to reciprocate the second cross head, plungers depending from the second cross head coacting with both molds, stripper rods extending into the lower molds, a bar connecting the lower ends of the stripper rods and means to raise said bar to elevate the stripper rods to loosen the objects made by the molds from the same.

Signed at the borough of Manhattan, city of New York, in the county of New York and State of New York, this 12th day of September, A. D. 1924.

HERMAN SONNENBERG.